United States Patent [19]

Barecki

[11] 4,106,810

[45] Aug. 15, 1978

[54] GRAB RAIL FOR TRANSIT VEHICLE SEATS

[75] Inventor: Chester J. Barecki, Grand Rapids, Mich.

[73] Assignee: American Seating Company, Grand Rapids, Mich.

[21] Appl. No.: 737,656

[22] Filed: Nov. 1, 1976

Related U.S. Application Data

[63] Continuation of Ser. No. 569,970, Apr. 21, 1975, abandoned.

[51] Int. Cl.² ............................................. A47C 11/00
[52] U.S. Cl. .................................... 297/183; 280/751
[58] Field of Search ................ 280/748, 751; 297/183, 297/445, 390, 391, 216; 16/111 R, 113, 119, 125; 105/345, 354

[56] References Cited

U.S. PATENT DOCUMENTS

| 1,013,044 | 12/1911 | Munford | 297/183 |
|---|---|---|---|
| 3,523,710 | 8/1970 | Barecki | 297/445 |
| 3,544,164 | 12/1970 | Ohta | 297/216 X |
| 3,747,978 | 7/1973 | Barecki | 297/445 |
| 3,802,738 | 4/1974 | Tantlinger | 297/183 X |
| 3,897,974 | 8/1975 | Barecki | 297/216 X |

Primary Examiner—Evon C. Blunk
Assistant Examiner—Michael J. Forman
Attorney, Agent, or Firm—Price, Heneveld, Huizenga & Cooper

[57] ABSTRACT

An energy-absorbing grab rail for a transit vehicle seat has a longitudinal core material and a covering material around the core material. Passenger movement assistance is provided with no or only slight deflection of the grab rail. Passenger restraint during abrupt movements of the vehicle such as occur in a collision is provided by a core having greater deflective characteristics in a selective direction and a resilient covering material. Additional passenger restraint is provided by deformation of the core material.

10 Claims, 5 Drawing Figures

GRAB RAIL FOR TRANSIT VEHICLE SEATS

CROSS REFERENCE TO RELATED APPLICATION

This is a Continuation of application Ser. No. 569,970, filed Apr. 21, 1975 now abandoned.

BACKGROUND

The present invention relates to a transit seat which is particularly suited for use in a mass transportation vehicle, such as a bus or a rapid transit train.

Grab rails have been used in transit seats, their principal advantages having been in assisting passengers either entering or leaving a seat and acting as an assist for standing passengers. For example, U.S. Pat. No. 3,797,887 issued to C. J. Barecki et al on Mar. 19, 1974 teaches a tubular steel rod attached to upper portions of a seat frame. Alternatively, a tubular steel frame has been vertically extended beyond a plastic shell for a seat to provide a grab rail which is spaced from the plastic shell. Such a grab rail-frame combination is disclosed in U.S. Pat. No. 3,747,979 issued to C. J. Barecki on July 24, 1973. However, grab rails as disclosed in these two patents can relatively easily produce injuries if a passenger strikes them during a vehicle collision or other sudden maneuver.

The need for protecting a passenger has been recognized. For example, U.S. Pat. No. 3,523,710 issued to C. J. Barecki et al on Aug. 11, 1970 teaches attaching to the seat frame rails metal panels enclosed in resilient cushioning. Additionally, U.S. Pat. No. 3,544,164 issued to S. Ohta on Dec. 1, 1970 teaches a readily deformable back frame for a vehicle seat in an attempt to protect the passenger against injury from the seat frame. However, no one has heretofore solved the problem of the danger to the passenger of a transit seat having a grab rail.

SUMMARY

In accordance with this invention, a grab rail provides three functions: a movement assistance for a passenger, a rail with which injury to the passenger's head and upper portion of the body by reason of striking it is substantially minimized, and a rail which compartmentalizes the passenger by providing an energy absorbing barrier thus protecting the passenger against striking the rigid structures such as the seat frame with his head or upper portion of the body. The grab rail of this invention includes a longitudinal core material and a covering material around the core material. The grab rail is spaced from the seat so it is easily grabbed and minimizes any obstruction of vision. The grab rail does not function as part of the seat support. Accordingly, it can be adapted to better fulfill the functions of passenger assistance and passenger compartmentalization.

In accordance with the preferred embodiment of this invention, the ends of the grab rail are attached to the frame of the seat. The grab rail has a core of tubular steel with a rectangular cross section, the vertical dimension of the cross section being shorter than the horizontal dimension so the rail deflects more easily in a vertical direction than a horizontal direction. Such relative dimensions take advantage of the fact that the grab rail does not bear vertical loads to support a seat and recognizes the fact that passenger collision with a grab rail is typically in a vertical or near vertical direction. The passenger is thrown forward and rotates down into the grab rail in front of him. Such relative dimensions further recognize and take advantage of the fact that loads to provide passenger assistance are typically in a horizontal or near horizontal direction. For example, to get up from a seat or to slide along a seat, the passenger pulls toward himself in a horizontal direction.

Surrounding the tubular steel core is a molded sheath of foam. The foam provides cushioning and thus additional protection for the passenger. In particular, it protects the passenger from abrasions and from any subsequently broken pieces of steel tubing. The sheath also provides a higher friction surface than steel for the passenger to grab. For example, some gloves have a tendency to slip on tubular steel. Molding the foam sheath onto the tubular core is advantageous because it helps prevent rotation of the sheath about the core. The foam sheath can be applied thicker at the ends of the grab rail to provide additional cushioning. The additional cushioning is advantageous because the ends of the tubular steel rail absorb vertical impact less readily than the intervening portions because of a vertical portion connecting the grab rail to the frame.

As a result of a cooperating structure, the grab rail provides an initial energy absorption by the deflection of the foam sheath, then by the deflection of the tubular core and finally by the deformation of the core. Advantageously, the grab-rail is detachably connected to the frame so it can be easily replaced if deformed.

DRAWINGS

DETAILED DESCRIPTION

Figure 1:
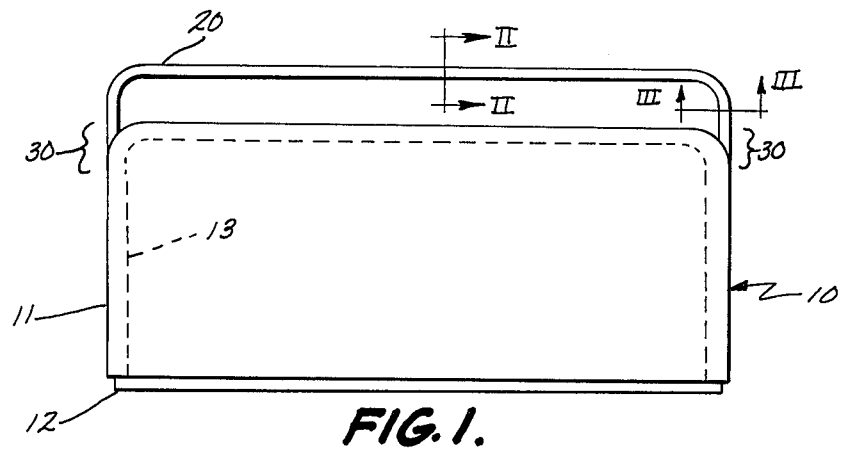
FIG. 1 is a frontal elevation view of a seat with a grab rail in accordance with an embodiment of this invention.

Referring to the drawings, a seat 10 has a generally vertical back portion 11 connected to a back frame member 13. Frame member 13 is not visible from the front and is shown as a dotted outline. Attached to frame member 13 at the end of seat 10 is a grab rail 20. Seat 10 also includes a generally horizontal seat portion 12.

Figure 2:
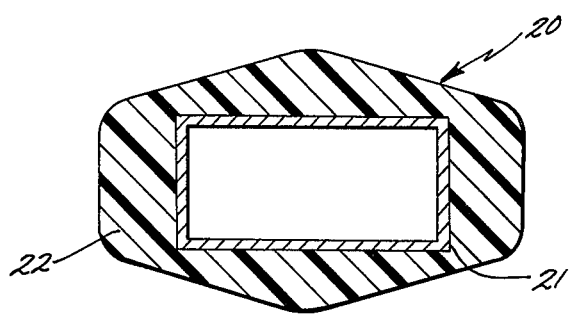
FIG. 2 is a cross-sectional view of the grab rail along section line II-II of FIG. 1.
Figure 3:
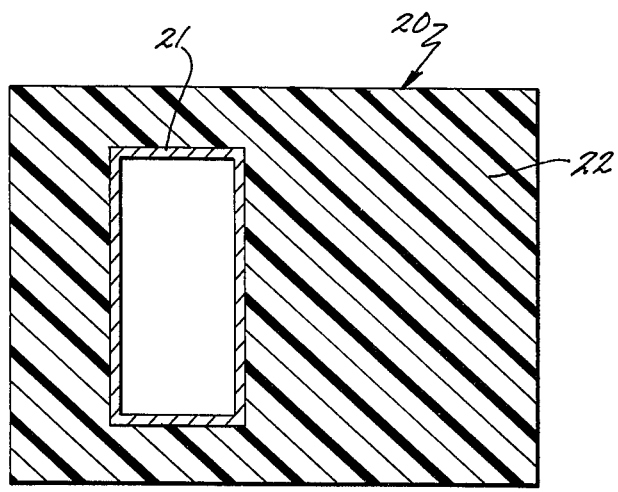
FIG. 3 is a cross-sectional view of the grab rail along section line III-III of FIG. 1.

As best seen in cross sections of FIG. 2 and FIG. 3, taken along section lines II—II and III—III of FIG. 1, respectively, grab rail 20 includes a rectangular tubular member 21 and a surrounding foam material 22. Typically, tubular member 21 is made from steel, and foam 22 is a urethane. More specifically, foam 22 can be a self-skinning urethane having a density of sixty to seventy durometer hardness and being molded onto tubular member 21. Other suitable energy absorbing materials such as, for example, neoprene, vinyl and other resilient plastic materials can also be used. Molding foam 22 on tubular member 21 and the rectangular cross section of tubular member 21 are both advantageous in preventing rotation of foam 22 about tubular member 21.

The vertical dimension of tubular member 21 is smaller than the horizontal dimension. Thus grab rail 20 gives more readily when struck by a body coming over the seat, providing a vertical force, than by a pull of a hand getting assist to leave the seat, providing a horizontal force. It can be seen from FIG. 3 that at the end portion of the grab rail, where the grab rail is basically vertical in direction, the urethane is thicker to compensate for the somewhat decreased ability of the steel tubular member 21 to deflect or deform in response to a vertical force.

Figure 5:
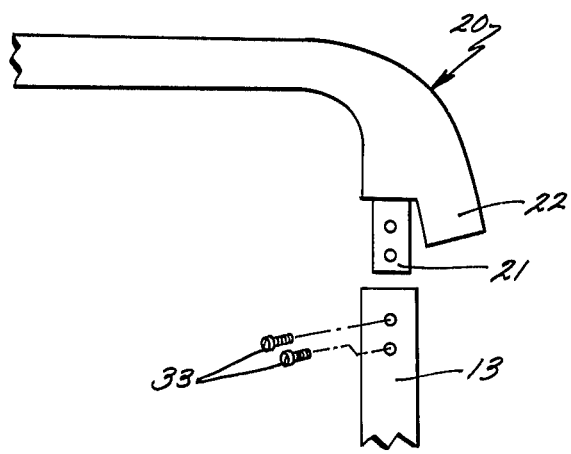
FIG. 5 is an exploded view of a section of the grab rail and seat frame.

Grab rail 20 is advantageously removable from frame 13. FIG. 1 shows an area 30 where rail 20 and frame 13 are joined. Typically, tubular member 21 inserts into a portion of frame 13 and pins or screws extend through frame 13 and tubular member 21. FIG. 5 shows the relative alignment of grab rail 20, frame 13 and screws 33 before insertion. Thus rail 20 can easily be removed if it is damaged by collision or vandalism. Foam 22 can extend downward around a portion of frame 13 where tubular member 21 is inserted. This provides additional cushioning and helps cover any screws in frame 13.

An example of dimensions of a typical tubular member 21 is ½ inch by ¾ inch. A typical wall thickness of tubular member 21 is from about 0.060 inches to about 0.046 inches. The thickness to absorb a given amount of energy is related to the length of the grab rail. A typical vertical dimension through the center of the grab rail 20 structure shown in FIG. 2 is ⅝ inches and a typical horizontal dimension through the center is 1-1/16 inches.

Figure 4:
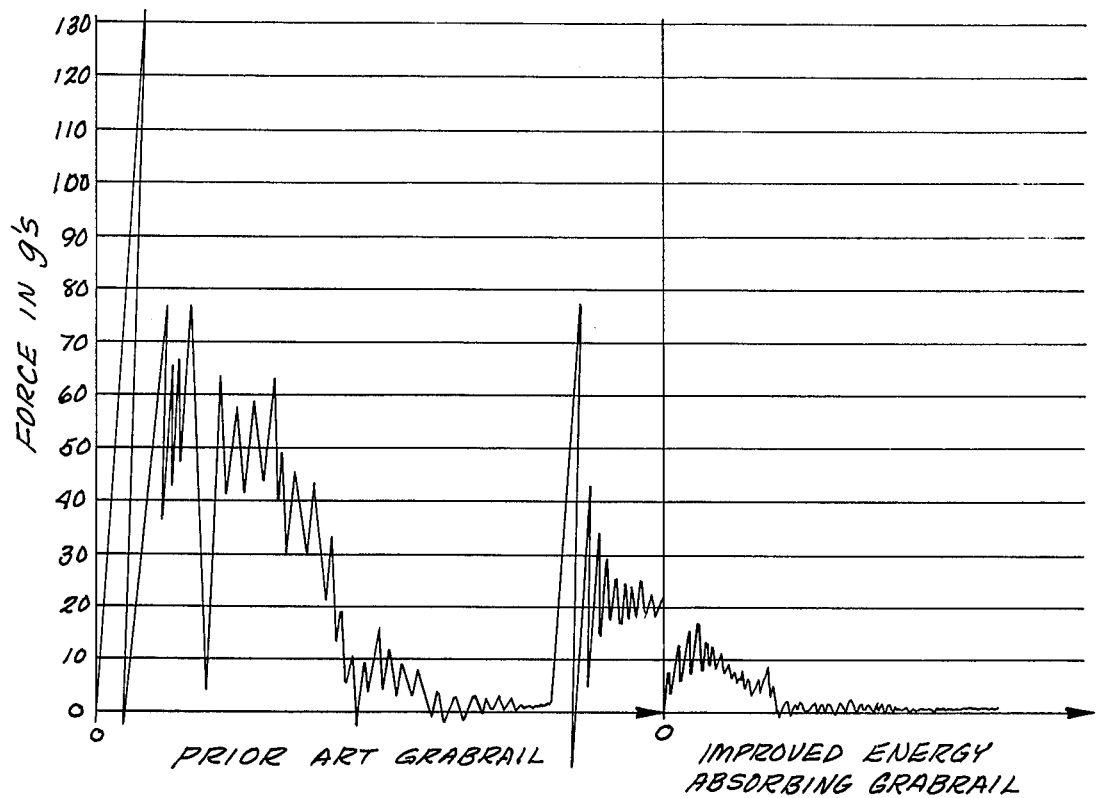
FIG. 4 is a graphical comparison of energy absorbing capabilities of a grab rail in accordance with an embodiment of this invention and a grab rail in accordance with the prior art.

FIG. 4 shows a graphical comparison of the deceleration produced by a grab rail in accordance with an embodiment of this invention and a grab rail in accordance with known prior art. The graphs represent the results of impact tests using a headform attached to a bodyform. The test simulates a body rotating and causing a head to strike in a near vertical direction the grab rail of the seat in front. The prior art grab rail produces a peak decelerative impact of 130 g's on a striking headform. In contrast, a grab rail in accordance with an embodiment of this invention produces a peak decelerative force of only 17 g's on a striking headform.

The test demonstrates a substantial reduction on the deceleration forces imposed on a passenger. A result of this reduction in force is reduced injury to a passenger. This improvement in safely restraining a passenger is partially due to the combination of resilient cushioning material, which prevents contusions, abrasions and surface injuries, with a deflectable and deformable metal tube, which is essential to absorbing a substantial applied force. The improvement is also due to choosing the relative and absolute dimensions of the grab rail, the tubular core and the foam sheath in view of such factors as a height and weight of typical passengers, typical vehicle speeds at collision and the properties of the materials of the grab rail.

The test also demonstrates that not only is injury by the grab rail substantially reduced but that the passenger is compartmentalized and prevented from striking rigid structures such as the seat frame. Transit vehicles typically get severe usage and a rigid seat frame is advantageous to help withstand such usage. The spacing of the grab rail above the seat frame permits substantial deflection and deformation of the grab rail and therefore substantial energy absorption, to stop the passenger's movement before he strikes the seat frame. Further, should the deflection of the grab rail reach the seat frame, a substantial amount of energy already has been absorbed and the force with which a passenger strikes the seat frame is accordingly reduced.

Various modifications and variations will no doubt occur to those skilled in the various arts to which this invention pertains. For example, the shape of the foam shield or the connection of the grab rail to the frame may be modified. Also, the grab rail may have a step so there are two levels. Typically, the higher level is placed closer to an aisle. These and all other variations which basically rely on the teachings through which this disclosure has advanced the art are properly considered within the scope of this invention.

The embodiments of the invention in which an exclusive property or privilege is claimed are defined as follows.

1. A seat for mass transportation vehicles having a back portion terminating at an upper edge, a grab rail means having end portions at each end extending upwardly from said upper edge and a central portion connected to said end portions, said grab rail means extending along substantially said entire edge and spaced vertically therefrom a distance so as to provide an open space therebetween thereby providing the functions of a rail for passengers behind said seat to grab to assist them in entering and leaving said seat and providing a barrier means which will minimize the propelling of such passengers over said seat, the improvement comprising: said grab rail means being constructed of at least one elongated rectangular, tubular core member having a cross section in which the width is greater than the depth, said member being more easily deflected by a force from a vertical direction than from a horizontal direction; said core member being covered on at least the sides and top by a cushioned material covering of a thickness which does not destroy the rail's function of being capable of being grabbed by passengers to assist them in entering and leaving said seat and which when subjected to a force deflects before deflection of the core member; said combination of said deflectable core member and said cushioned material covering providing an energy absorbing grab rail for absorbing forces exerted thereon by a passenger striking the same in the event of sudden deceleration of the vehicle in which the seat is located; said energy absorption being provided by initial deflection of the cushioning material, then deflection of the core member, and if the force is sufficiently great, the subsequent deformation of the core member.

2. A seat with a grab rail as recited in claim 1 wherein the core material is a tubular metal and a covering material is a cushioning foam attached completely around at least a longitudinal portion of the tubular metal by molding onto the tubular metal.

3. A seat with a grab rail as recited in claim 2 wherein the tubular metal is a steel member having a substantially rectangular cross section, the vertical dimension of the cross section being less than the horizontal dimension, and the cushioning foam is a resilient plastic material.

4. A seat with a grab rail as recited in claim 1 wherein the core is a tubular member which has a substantially rectangular cross section, the horizontal dimension being about one and one-half times the vertical dimension.

5. A seat with a grab rail as recited in claim 1 wherein the cushioning material is a self-skinning urethane having a density of about between 60 and 70 durometer hardness.

6. A seat with a grab rail as recited in claim 1 wherein the cushioning material is molded to the tubular member for preventing rotation of said material about said tubular member.

7. A seat with a grab rail as recited in claim 1 wherein, the dimensions of the tubular member are about ½ inch by ¾ inch, the wall thickness of the tubular member is from about 0.060 to about 0.046 inches, the density of the material covering is between 60 and 70 durometer hardness, the vertical dimension of the tubular member and the material covering through the center of the grab rail is about ⅞ inches, and the horizontal dimension of the tubular member and the material covering through the center of the grab rail is about 1-1/16 inches.

8. A seat with grab rail as recited in claim 1 in which the thickness of the cushioning material is thicker above the longitudinal center of the top wall of the core member than above the longitudinal edges of the core member.

9. The seat with grab rail as recited in claim 8 in which the outer shape of the rail includes a top surface tapering from the longitudinal center to the longitudinal sides thereof.

10. The seat with grab rail as recited in claim 8 in which the shape of the rail includes top and bottom surfaces tapering from the longitudinal center to the longitudinal sides thereof.

* * * * *